United States Patent
Noschese et al.

[11] Patent Number: 5,898,566
[45] Date of Patent: Apr. 27, 1999

[54] POWER DISTRIBUTION AND LIMITER ASSEMBLY

[75] Inventors: Rocco J. Noschese, Wilton; Frederick D. Hooper, Norwalk, both of Conn.

[73] Assignee: Burndy Corporation, Fairfield, Conn.

[21] Appl. No.: 08/095,276

[22] Filed: Jul. 21, 1993

Related U.S. Application Data

[62] Division of application No. 07/924,129, Aug. 3, 1992, Pat. No. 5,274,528.

[51] Int. Cl.⁶ .................................................. H02B 1/04
[52] U.S. Cl. ..................... 361/642; 174/99 B; 361/610; 361/637; 361/646; 361/775; 361/833
[58] Field of Search ................. 174/99 B, 72 B, 174/88 B, 70 B, 71 B; 361/610, 637, 642, 646, 755, 833

[56] References Cited

U.S. PATENT DOCUMENTS

| | | | |
|---|---|---|---|
| 636,905 | 11/1899 | Klein | 361/630 |
| 736,598 | 8/1903 | Hall et al. | 361/630 |
| 1,039,139 | 9/1912 | Joleen | 361/657 |
| 1,170,566 | 2/1916 | Skeel | 361/631 |
| 1,981,929 | 11/1934 | Starrett | 361/650 |
| 2,468,614 | 4/1949 | Carlson | 174/99 B |
| 2,766,405 | 10/1956 | Edmunds . | |
| 2,786,152 | 3/1957 | Fisher | 174/99 B X |
| 3,142,738 | 7/1964 | Friedman | 361/630 |
| 3,726,988 | 4/1973 | Davis | 174/99 B X |
| 4,825,336 | 4/1989 | Iio et al. | 361/637 |
| 5,144,530 | 9/1992 | Cohen et al. | 174/99 B X |

*Primary Examiner*—Hyung-Sub Sough
*Attorney, Agent, or Firm*—Perman & Green, LLP

[57] ABSTRACT

An assembly for both distributing electricity and limiting the flow of current has a housing, input conductors, first output conductors, second output conductors, an insulating spacer block, and limiters. Portions of the input conductors and first output conductors overlay each other with the insulating spacer block therebetween. The limiters electrically connect the input conductors to the output conductors with pairs of limiters connected between a single input conductor and separate output conductors.

1 Claim, 5 Drawing Sheets

POWER DISTRIBUTION AND LIMITER ASSEMBLY

This is a divisional of application Ser. No. 07/924,129 filed on Aug. 3, 1992; now U.S. Pat. No. 5,274,528.

BACKGROUND OF THE INVENTION

1. Field of the Invention

The present invention relates to power distribution and, more particularly, to an assembly for both distributing and limiting electric current.

2. Prior Art

Various U.S. Patents describe numerous different types of power distribution and fuse or circuit interrupter arrangements including the following: 636,905; 736,598; 1,039,139; 1,170,566; 1,981,929; 2,766,405; 3,142,738; and 4,825,336. One particular type of power transmission is accomplished by use of three phase conductor cable that has three conductors; one for ground, one for supply, and one for return.

One problem has developed in the prior art in that, although systems are known that distribute and provide individual fuses or circuit limiters to the distributed power branches in three phase systems, no adequate assembly has been provided for compact and lightweight applications, such as for use in an aircraft.

It is therefore an objective of the present invention to provide a new and improved power distribution aid limiter assembly.

SUMMARY OF THE INVENTION

The foregoing problems are overcome and other advantages are provided by a new and improved power distribution and limiter assembly.

In accordance with one embodiment of the present invention, a power distribution and limiter assembly is provided comprising a housing, input conductors, first output conductors, second output conductors, an insulating spacer block, and limiters. The, input conductors are connected to the housing and each input conductor has a terminal at opposite ends of the conductor. The first output conductors are connected to the housing with at least some of the output conductors overlaying at least some of the input conductors. The second output conductors are connected to the housing with the input conductors, first output conductors, and second output conductors all being spaced from each other. The insulating spacer block is located between the input conductors and the first output conductors to electrically isolate overlaying portions of the conductors from each other. The limiters electrically connect the input conductors to the output conductors and are comprised of pairs of limiters with first ends of both limiters of a pair connected to a single input conductor terminal and second ends of each limiter connected to a separate output conductor.

In accordance with another embodiment of the present invention, a power distribution and limiter assembly is provided comprising three sets of conductive bus bars, a spacer block, a housing, and three pairs of limiters. Each bus bar has a first terminal at a first end and a second terminal at a second end with two of the sets of bus bars at least partially overlapping each other. The spacer block is located between portions of the overlapping sets of bus bars. The housing has the bus bars connected thereto with the terminals extending through the housing. The three pairs of limiters electrically connect a first set of the bus bars to a second set and a third set of the bus bars. Each limiter has a first end connected to a second end terminal of the first set of bus bars and a second end connected to a first end terminal of either one of the second and third sets of bus bars.

In accordance with another embodiment of the present invention, a power distribution and limiter assembly is provided comprising a base, a housing connected to the base, a cover connected to the housing, three sets of bus bars, a spacer block, and limiters. The three sets of bus bars are sandwiched between the base and the housing and have terminals extending through the housing to a space between the housing and cover. A first set of input terminals is located at a first side of the housing and two sets of output terminals are located at an adjacent second side of the housing generally perpendicular to the first side. The spacer block is located between overlapping portions of the first and second sets of bus bars. Limiters connect the first set of bus bars with the second set of bus bars and a third set of bus bars.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
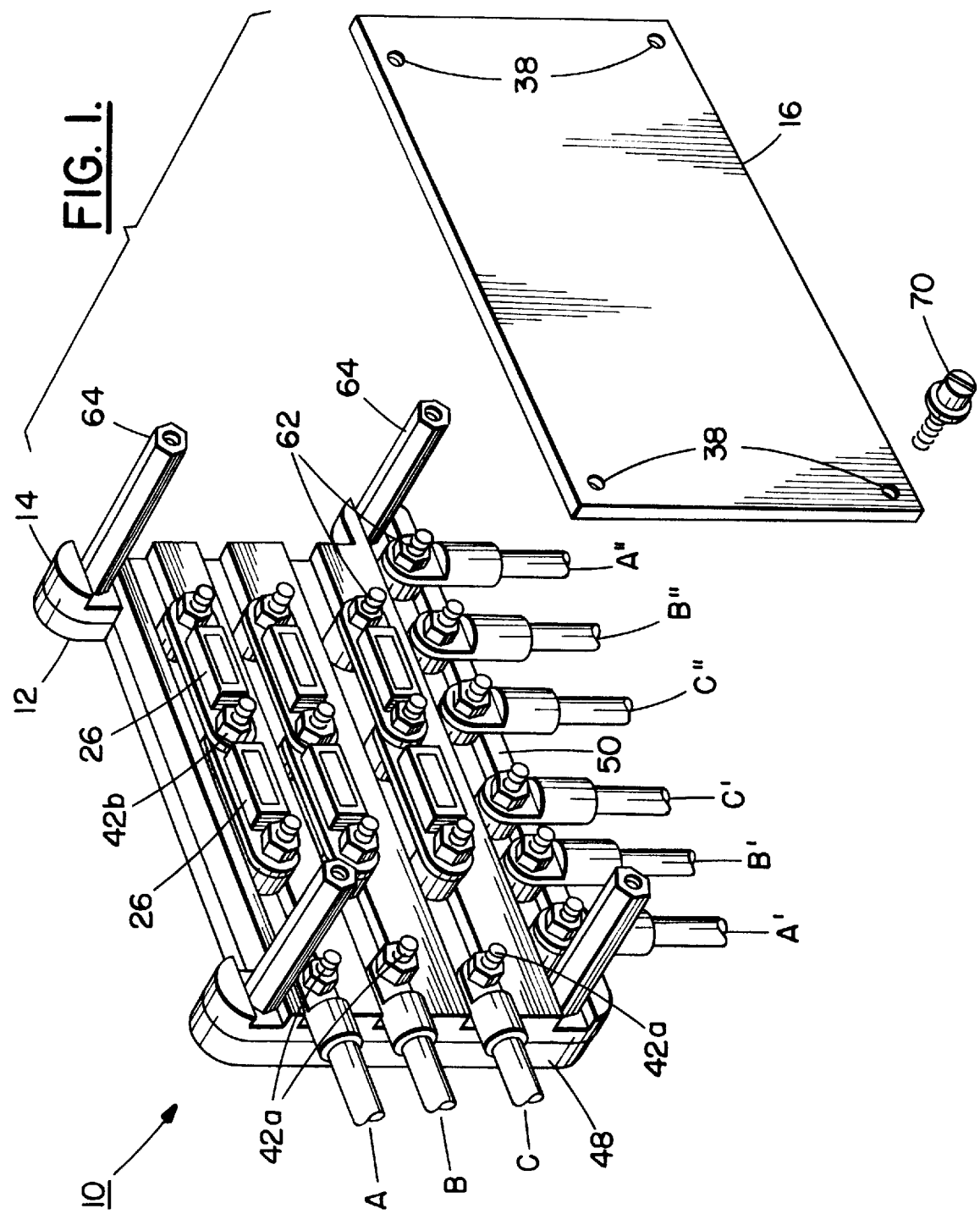
FIG. 1 is a perspective view of a power distribution and limiter assembly comprising features of the present invention.
Figure 2:
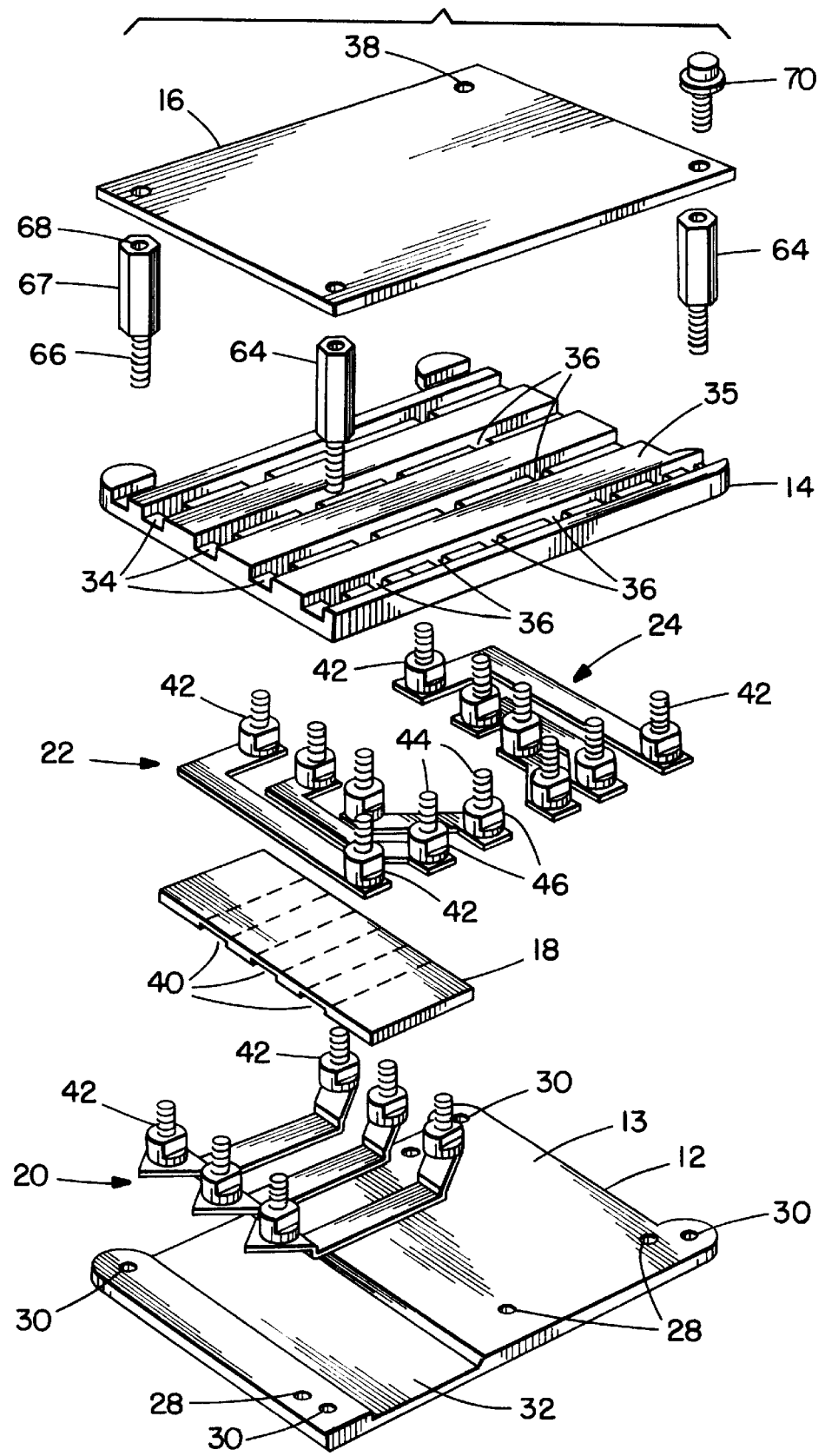
FIG. 2 is an exploded perspective view of portions of the assembly shown in FIG. 1.

Referring to FIGS. 1 and 2 there is shown a power distribution and limiter assembly 10 comprising features of the present invention. Although the present invention will be described with reference to the embodiments shown in the drawings, it should be understood that the present invention may be embodied in various different types of embodiments. In addition, any suitable size, shape or type of elements or materials may be used.

The assembly 10 generally comprises a base 12, a housing 14, a cover 16, a spacer block 18, three sets of conductors 20, 22, 24, limiters 26 and mounting hardware. The limiters 26 are not shown in FIG. 2 for the sake of clarity. The base 12 is preferably made of a dielectric material, such as a polymer or plastic, and has a generally planar shape with holes 28, holes 30, and a recess or groove 32. The first set of holes 28 are provided to receive screws (not shown) to mount the base 12 to the housing 14. However, any suitable means to connect the base and housing could be provided. The housing 14 also has a general planar shape and is comprised of dielectric material. The top side 35 of the housing 14 has linear grooves 34 and holes 36 that pass through the housing at the grooves 34. The cover 16 is generally planar with holes 38 passing therethrough. The spacer block 18 is comprised of dielectric material and has a general block shape with three channels 40 along its underside. The block 18 is suitably sized and shaped to be received in the base groove 32 and form a relatively flush surface with the top side 13 of the base 12.

Figure 3:
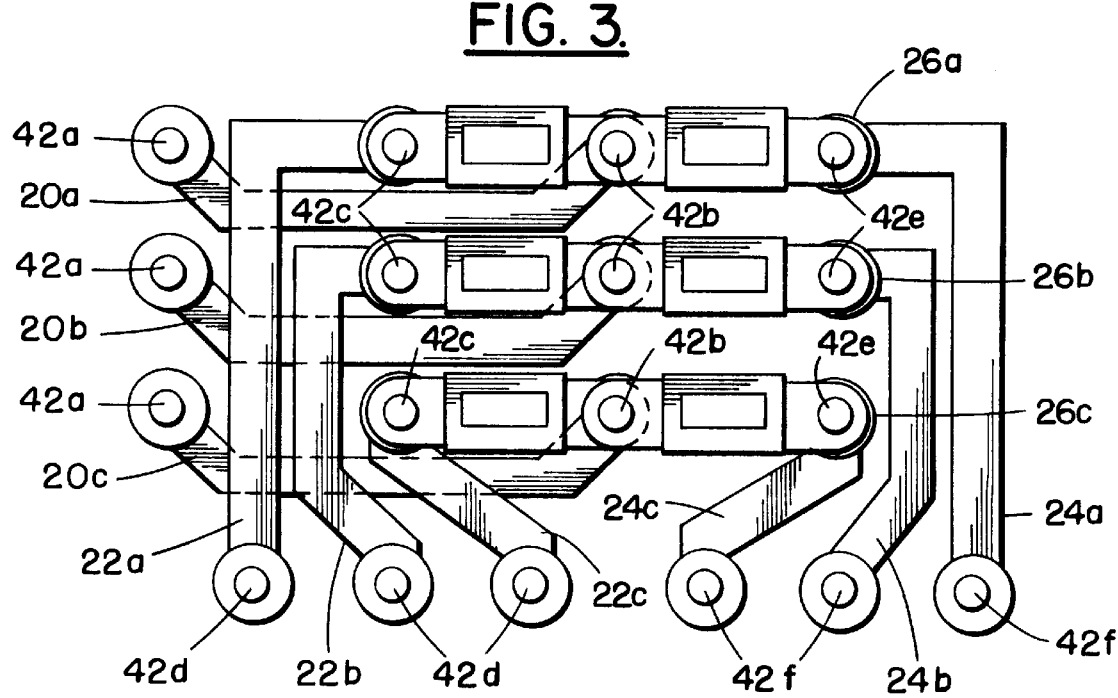
FIG. 3 is a schematic top view of the conductors and limiters of the assembly shown in FIG. 1.

Referring also to FIG. 3, the first set of conductors 20 generally comprises three bus bars 20a, 20b, 20c made of electrically conductive material. Each bus bar 20a, 20b, 20c has two terminals 42, one terminal connected to each opposite end of each bus bar. The terminals 42 are fixedly connected to the bus bars and generally comprise upstanding posts with threaded sections 44 and shaped sections 46 positioned in holes 36 of the housing 14. The bus bars 20a, 20b, 20c have a general U-shaped top profile with a recessed or offset center area. The recessed center area is provided such that the bus bars 20a, 20b, 20c can extend into the base groove 32, but still have its ends rest on the top surface 13 of the base 12. The spacer block 18 is located in the base groove 32 with the recessed center areas of the bus bars 20a, 20b, 20c located in the spacer block grooves 40. These first set of conductors 20 constitute input conductors adapted to have input wires A, B, C of a three phase conductor cable connected thereto. In the embodiment shown, the first set of conductors has first end terminals 42a connected to first ends of the bus bars and aligned in a row at a first side 48 of the housing. The second end terminals 42b are connected to second ends of the bus bars, and aligned in a row at the center of the housing.

The second and third sets of conductors 22 and 24 are substantially mirror images of each other and are intended to act as branch or output conductors for the input conductors. The second set of conductors 22 has three planar bus bars 22a, 22b, 22c with terminals 42 at each end of each bus bar 22a, 22b, 22c. The terminals of the second set of conductors have first end terminals 42c aligned in a row parallel to the first conductors second end terminals 42b and, second end terminals 42d aligned in a row at a second side 50 of the housing 14, generally perpendicular to the first side 48. The third set of conductors 24 has three planar bus bars 24a, 24b, 24c with terminals 42 at each end of each bus bar 24a, 24b, 24c. The terminals of the third set of conductors have first end terminals 42e aligned in a row parallel to the first conductors second end terminals 42b and, second end terminals 42f aligned in a row at the second side 50 of the housing 14, spaced from the second conductors second end terminals 42d. The second and third sets of conductors 22 and 24 are generally sandwiched between the base 12 (or spacer block 18) and the housing 14 with the exception of their first and second end terminals 42c, 42d, 42e, 42f that extend up through holes 36 in the housing 14. In the embodiment shown, the second and third set first end terminals 42c and 42e are located on opposite sides of the first set second end terminals 42b. Portions of the first and second sets of bus bars 20a, 20b, 20c and 22a, 22b, 22c overlap or overlie each other with the spacer block 18 therebetween. As noted above, the second set second end terminals 42d and third set second end terminals 42f are located along the housing second side 50. The second set second end terminals 42d are adapted to have a first set of output wires A', B', C' of a three phase conductor cable connected thereto. The third set second end terminals 42f are adapted to have a second set of output wires A", B", C" of a three phase conductor cable connected thereto. Due to the unique configuration of the bus bars and the use of the spacer block, all of the sets of conductors 20, 22, 24 are spaced from each other. The underside of the housing 14 also preferably has channels (not shown) to receive the second and third sets of conductors 22 and 24. The grooves 34 in the top side of the housing 14 are provided to partially receive the limiters 26. However, the grooves 34 need not be provided. In the embodiment shown, all of the terminals 42 are located in a single plane. A space is created between the housing 14 and cover 16 in which all of the terminals 42 are located. Nuts 62 are used to fix the wires and limiters to the terminals 42.

Figure 4:
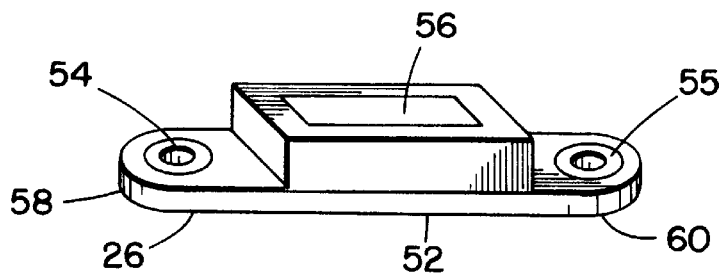
FIG. 4 is a perspective view of one of the limiters shown in FIG. 1.

The assembly 10, in the embodiment shown, has six limiters 26 arranged in three sets 26a, 26b, 26c of two limiters each. Referring also to FIG. 4, each limiter 26 has a housing 52, two end terminals 54 and 55, a view window 56, and a fuse (not shown) connecting the two end terminals to each other. The housing 52 is made of dielectric material with a first end 58 and a second end 60. The first terminal 54 is located in the first end 58 and has a hole to receive a threaded section 44 of one of the terminals 42. The first terminal 54 is electrically connected to one end of the fuse which can be seen through the view window 56. The second terminal 55 is electrically connected to the other end of the fuse and is located in the second end 60 of the housing 52. The second terminal 55 is substantially the same as the first terminal 54 such that it can receive a threaded section 44 of one of the terminals 42. Thus, the fuse can act as a current limiter between terminals 54 and 55.

As best seen in FIG. 3, the first set second end terminals 42b each have the two limiters 26 of one of the pairs of limiters connected thereto. A first terminal 54 of each limiter of the pair is connected to a single terminal 42b. The second terminal 55 of each limiter of each pair is connected either to one of the second set first end terminals 42c or to one of the third set first end terminals 42e. In the event that one of the limiters is overloaded, it will burn out and thereby break the current flow path. In an alternate embodiment, circuit breakers could be used as the limiters rather than fuses.

In the embodiment shown, the mounting hardware includes four post connectors 64. Each post connector 64 has a threaded post section 66, a standoff section 67, and a threaded hole 68. The threaded post section 66 of each connector 64 extends through the housing 14 and hole 30 of the base 12 and, can be attached to a member, such as a frame of an aircraft. The standoff section 67 of each connector 64 rests on the top surface of the housing 14. The assembly 10 has screws 70 that pass through holes 38 in the cover 16 and screw into the threaded holes 68 to thereby fixedly, but removably mount the cover 16 to the post connectors 64. Thus, the cover 16 is spaced from the housing 14 by the standoff sections 67 and can be removed from the housing 14 without removing the post connectors 64.

Figure 5:
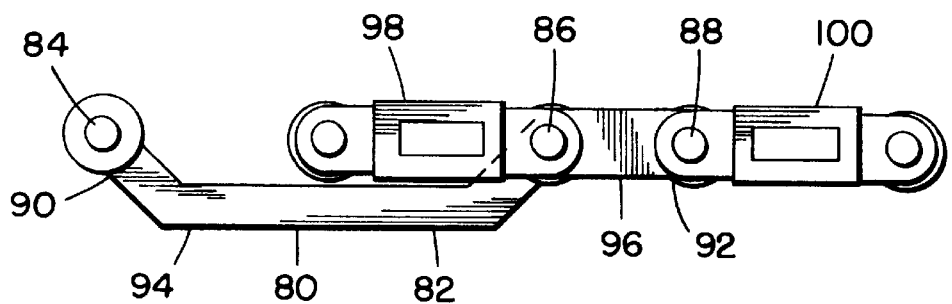
FIG. 5 is a schematic top view of an alternate embodiment of an input conductor and two limiters connected to the input conductor.

Referring to FIG. 5, there is shown a schematic top view of an alternate embodiment of an input conductor with two limiters attached to it. The input conductor 80 has a bus bar 82, a first terminal 84, a second terminal 86, and a third terminal 88. The terminals 84, 86, 88 are substantially identical to terminals 42 shown in FIGS. 1–2. The first terminal 84 is connected to a first end 90 of the bus bar 82. The third terminal 88 is connected to the opposite second end 92 of the bus bar 82. The second terminal 86 is connected to an intermediate location of the bus bar 82. Span 94 of the bus bar 82 is substantially similar to the bus bar 20 shown in FIG. 3. The bus bar 82 also has a span 96 between the second and third terminals 86 and 88. A first end of the first limiter 98 is connected to the second terminal 86. A first end of the second limiter 100 is connected to the third terminal 88. Thus, the second and third terminals 86 and 88 perform the same function as terminals 42b in FIG. 3. Hence they can act as two second end terminals for the input conductor 80. With this type of input conduct or, replacement of individual limiters 98 or 100 may be easier than the embodiment shown in FIGS. 1–3 where both limiters of a pair of limiters may need to be removed in order to replace a single limiter (such as when the limiter to be replaced is located under the other limiter of a pair at one of the terminals 42b).

Figure 6:
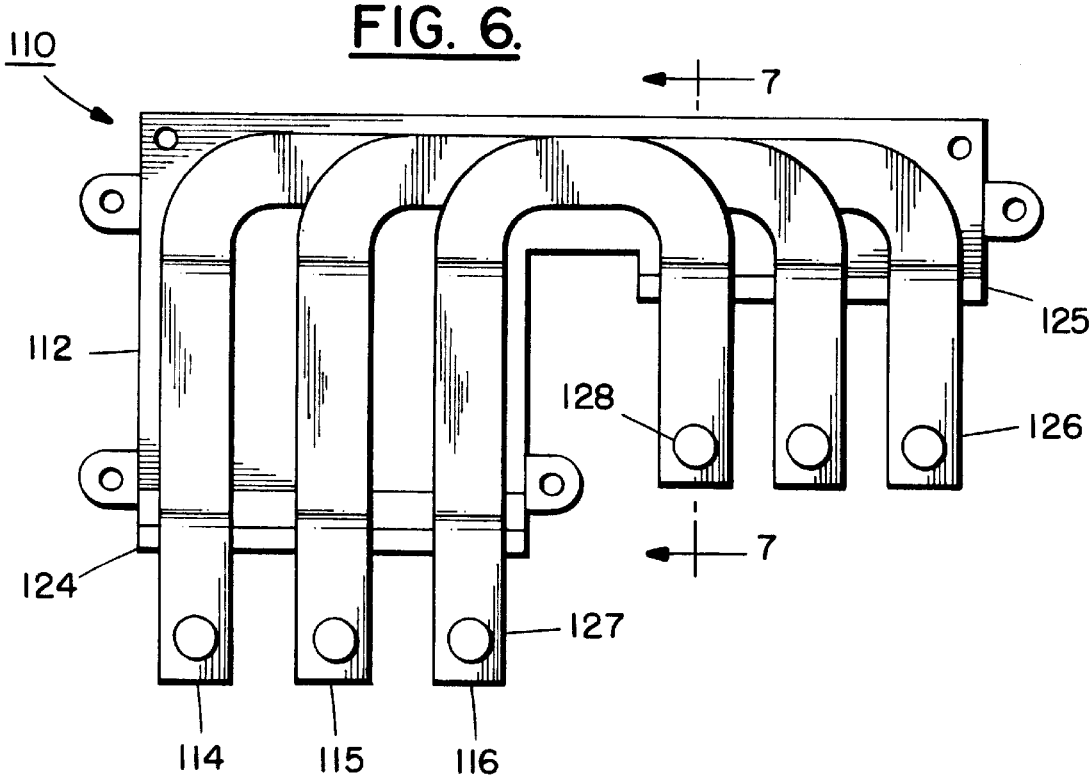
FIG. 6 is a schematic top view of an alternate embodiment of the present invention.
Figure 7:
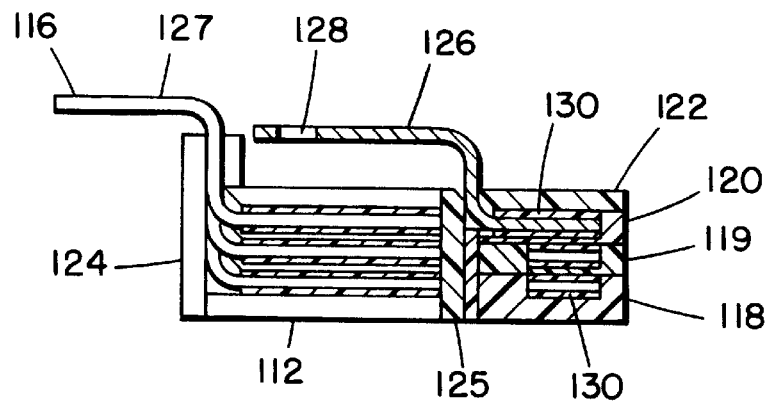
FIG. 7 is a schematic cross-sectional view of the bus connector assembly shown in FIG. 6 taken along line 7—7.

Referring now to FIGS. 6 and 7, there is shown an alternate embodiment of the present invention. In the embodiment shown, the assembly 110 generally comprises a housing 112 and three bus bars 114, 115, 116. The assembly 110 is a busing assembly intended to provide a tight path of redirection that a thick electrical cable would not otherwise be able to safely accomplish in the same space. In the embodiment shown, the assembly 110 is adapted to redirect a three-phase electrical cable (not shown) 180° to a second three-phase electrical cable (not shown). The housing 112 generally comprises three bus bar holding plates 118, 119, 120, a cover plate 122, and two front plates 124, 125. Each of the bus bar holding plates 118–120 have grooves along their top surfaces in order to hold the bus bars 114–116 therein. As can be seen in FIG. 7, each of the bus bars 114–116 is individually sandwiched between two plates. In a preferred embodiment, the assembly 110 is for use in an aircraft. Therefore, predetermined areas of the plates 114–116 will have slots therethrough and recessed areas in order to reduce the weight of the assembly 110.

In the embodiment shown, the bus bars 114–116 each have a general U-shaped flat configuration with two rows of offset terminals 126, 127 located at different heights. The bus bars are comprised of metal conductors having an insulative cover. In a preferred embodiment, the insulative cover is a baked-on epoxy. However, a vinyl dip could also be used. The terminals 126 and 127 each have a hole 128 such that a fastening device (not shown) such as a bolt or screw can be used to fasten conductors of the two cables (not shown) to the terminals 126 and 127. In the embodiment shown, the assembly 110 also comprises a plurality of silicon sponges 130 that function as floaters for the bus bars 114–116 in order to allow the bus bars a predetermined limited range of vertical movement such as±0.050 inch. As can be seen, each bus bar has two sponges 130; one adjacent their top sides and one adjacent their bottom sides. The sponges 130 extend along the entire length of the bus bars inside the housing 112. The assembly 110 is assembled in the sandwich or stacked configuration shown in FIG. 7 and the front plates 124, 125 are attached to protect the fronts of the bus bars. The plates 118–120 and cover 122 are all fixedly fastened together to hold the assembly together. With this type of embodiment, the terminal ends 126 and 127 can be vertically adjusted, at least partially, due to deflection or deformation of the sponges 130. This allows a little play in the terminal ends 126, 127 for situations such as when the cables (not shown) have a terminal connectors that is intended to attach to all three of either the terminal ends 126 or terminal ends 127 in a single mounting step. The adjustable nature of the terminal ends 126, 127 makes such a procedure relatively simple.

Figure 8:
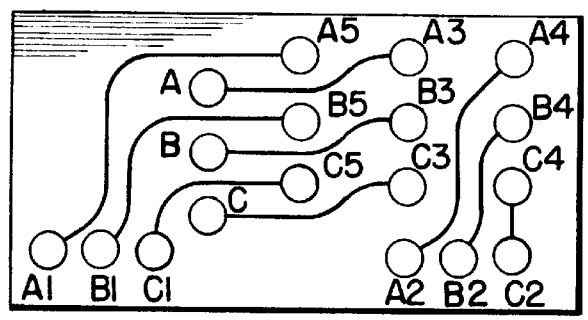
FIG. 8 is a circuit diagram of an alternate embodiment of the present invention.

Referring to FIG. 8, there is shown a circuit diagram of an alternate embodiment of a power distribution and limiter assembly. The embodiment shown is similar to the embodiment shown in FIGS. 1–3. However, in this embodiment, none of the bus bars would overlap. Incoming conductors would be attached to terminals A, B and C. Limitators would be provided between terminals A3, A4, A5; B3, B4, B5; and C3, C4, C5. Output conductors would be attached to terminals A1, B1, C1 and A2, B2, C2.

Figure 9:
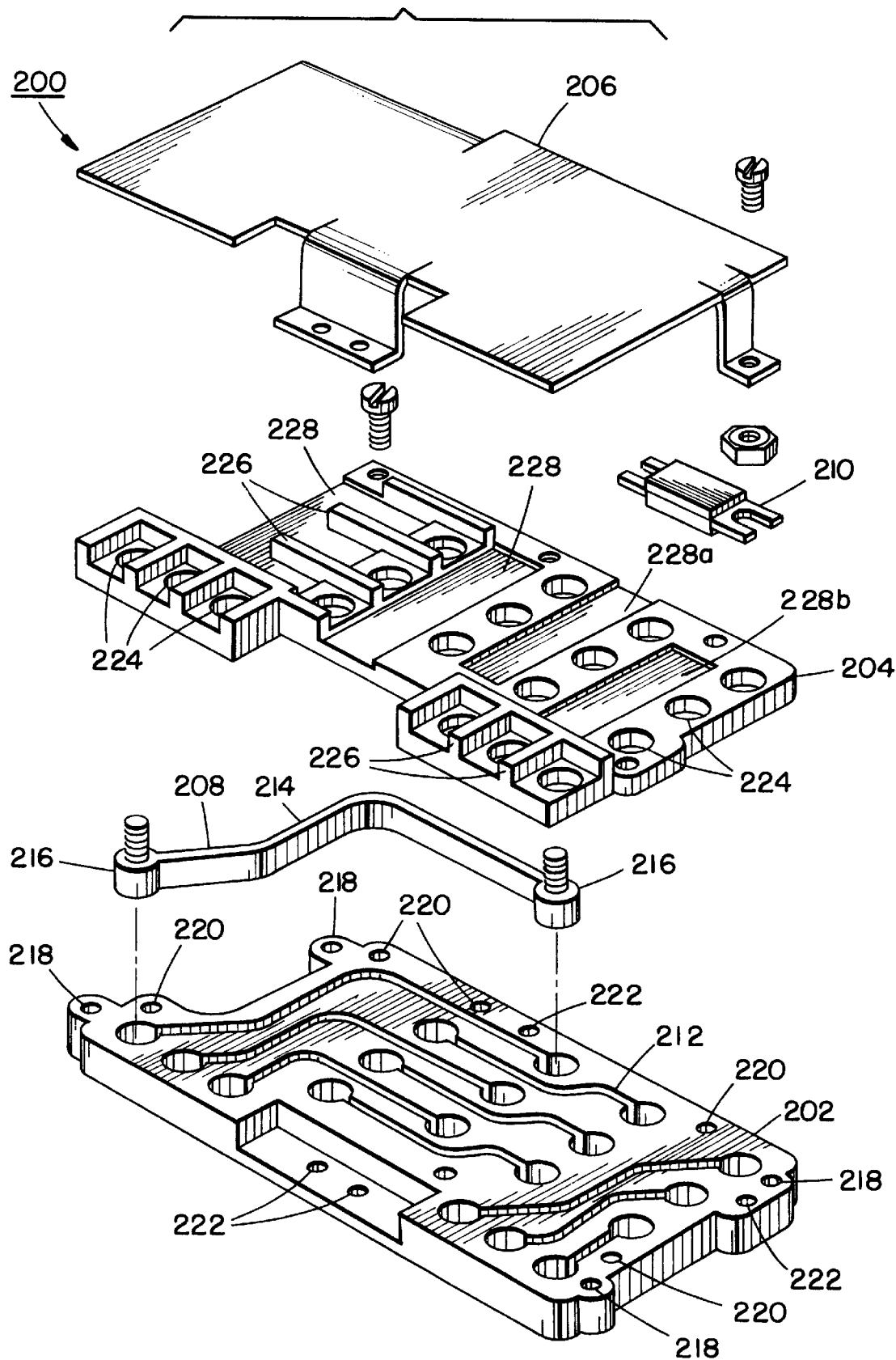
FIG. 9 is an exploded perspective view of one type of embodiment corresponding to the circuit diagram shown in FIG. 8.

Referring also to FIG. 9, there is shown an exploded perspective view of a power distribution and limiter assembly 200 that generally corresponds to the circuit diagram shown in FIG. 8. The assembly 200 generally comprises a housing base 202, a housing top 204, a cover 206, nine bus bar and terminal members 208 (only one of which is shown for the sake of clarity), and six limiters 210 (only one of which is shown for the sake of clarity). The housing base 202 and housing top 204 are both comprised of a dielectric material. The base 202 has nine receiving slots 212 adapted to snugly receive and support the nine bus bar and terminal members 208. Each of the slots 212 has a center section with a small width and a relatively deep depth to accommodate the bus bar sections 214. The bus bar and terminal members 208 each have a bus bar section 214 and two terminals 216 located on opposite ends of the bus bar section 214. In this embodiment, the bus bar sections 214 are arranged generally perpendicular to the plane of the housing base 202 and, are suitably shaped and positioned so as not to cross over each other. This type of arrangement allows for a relatively compact assembly. Selected portions of the housing base 202 can be relieved for weight reduction. The housing base 202 also has holes 218 for mounting the assembly 200 to a frame, such as an aircraft frame, holes 220 for mounting the housing top 204 to the housing base 202, thereby sandwiching the members 208 in the slots 212, and holes 222 for mounting the cover 206 to the base 202.

The housing top 204 includes eighteen holes 224 arranged and adapted to have portions of the terminals 216 extend therethrough. The top 204 has separator sections 226 between holes 224 at the areas that terminals of conductor cables will be attached. These separator sections 226 prevent the terminals of the cables from inadvertently touching each other. The housing top 204 also includes recessed areas 228 on its top side for weight reduction. Two of these recessed areas 228a and 228b are also used to partially recess the bottoms of the limiters 210. This helps to keep the assembly compact. The limiters 210 are similar to the limiters discussed above. Six limiters are provided and are attached to pairs of terminals 216; A3–A5, A3–A4, B3–B5, B3–B4, C3–C5, C3–C4 (see FIG. 8). The cover 206 is also comprised of dielectric material and provides a protective cover over the limiters and terminals. In a preferred embodiment, the cover 206 is made of clear plastic in order to visually inspect the limiters without having to remove the cover 206. With the assembly 200 shown, a first input three phase conductor cable can be connected to terminals A, B, C and two second output three phase conductor cables can be connected to terminals A1, B1, C1 and A2, B2, C2. Power from the first input cable can thus be distributed, through the limiters, to the two second output cables.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed:

1. A three phase electrical distribution and limiter assembly comprising:

a dielectric housing having a base and a top, the base having conductor receiving slots therein, each slot having a center section with a small width and a relatively deep depth in the base;

three sets of conductors located, at least partially, in the conductor receiving slots, the conductors each comprising a flat bus bar section and terminals at opposite ends of each bus bar section, planes of the bus bar sections being arranged generally perpendicular to a plane of the base, the conductors being snugly positioned in the receiving slots in general non-crossing relationship relative to each other with the top being attached to the base and sandwiching the bus bar sections between the base and top; and three pairs of limiters electrically connecting a first set of the conductors to the two other sets of conductors.

* * * * *